United States Patent [19]

Dubois et al.

[11] Patent Number: 4,829,367

[45] Date of Patent: May 9, 1989

[54] APPARATUS AND METHOD FOR ENCODING AND DECODING A NTSC COLOR VIDEO SIGNAL

[75] Inventors: Eric Dubois, Brossard; Pierre Faubert, St-Bruno, both of Canada

[73] Assignee: Institut National De La Recherche Scientifique, Quebec, Canada

[21] Appl. No.: 121,809

[22] Filed: Nov. 17, 1987

[30] Foreign Application Priority Data

Aug. 28, 1987 [CA] Canada .................................. 545637

[51] Int. Cl.$^4$ .............................................. H04N 9/78
[52] U.S. Cl. ........................................ 358/31; 358/12; 358/16
[58] Field of Search ....................... 358/31, 12, 15, 16

[56] References Cited

U.S. PATENT DOCUMENTS

| 4,167,020 | 9/1979 | Holmes | 358/36 |
| 4,184,174 | 1/1980 | Aschwanden | 358/31 |
| 4,333,104 | 6/1982 | Geller | 358/23 |
| 4,345,268 | 8/1982 | Clarke | 358/31 |
| 4,352,122 | 9/1982 | Reitmeier et al. | 358/11 |
| 4,500,912 | 2/1985 | Bolger | 358/31 |
| 4,524,423 | 6/1985 | Acampora | 364/724 |
| 4,621,286 | 11/1986 | Reitmeier et al. | 358/12 |
| 4,641,179 | 2/1987 | Lo Cicero et al. | 358/16 |
| 4,670,773 | 6/1987 | Silverberg | 358/12 |
| 4,683,490 | 7/1987 | Strolle et al. | 358/31 |

FOREIGN PATENT DOCUMENTS 68792   4/1985   Japan .................................. 358/31

OTHER PUBLICATIONS

Baldwin et al., Spatial Filters, IBA Tech. Rev. No. 8, Sep. 1976 pp. 41–48.
Turner, Some Thoughts On Using Comb Filters In The Broadcast Television Transmitter And At The Receiver, IEEE Transactions On Consumer Electronics, vol. CE-23 No. 3 Aug. 1977 pp. 248–257.
Colour Demodulation of an NTSC Television Signal Using Digital Filtering Techniques, A. G. Deczky, Proc. International Conference on Communications (ICC'75), San Francisco, Jul. 1975, pp. 23-6 to 23-10.

Primary Examiner—John W. Shepperd
Attorney, Agent, or Firm—Foley, Lardner, Schwartz, Jeffery, Schwaab, Mack, Blumenthal & Evans

[57] ABSTRACT

The present disclosure describes a color video signal encoding system for generating a NTSC color image composite signal for a television receiver. A luminance signal Y and two chrominance signals I and Q are modulated on a color subcarrier having a frequency $F_{sc}$. The television receiver has an intrafield vertical sampling frequency $F_1$. The encoding system comprises a first non separate two dimensional filter for low pass filtering the chrominance signal I, and a second non separable two dimensional filter for low pass filtering the chrominance signal Q. A third non separable two dimensional filter is used for band-stop filtering the luminance signal. The third filter has a stop band centered on $\pm F_{sc}$ and $\pm F_1/2$. The stop band has a shape similar to the shape of the band pass of the first filter so that said chrominance signals I and Q filtered by said first and second filter means can be inserted in the band covered by said stop band. The encoding system also comprises a modulator connected to the output of the first and second filter and an adder for adding signals generated by the third filter and the modulator, and generating a signal representative of the NTSC color image composite signal. The present disclosure also describes a color video signal decoding system and two methods for respectively encoding and decoding the NTSC color image composite signal.

14 Claims, 7 Drawing Sheets

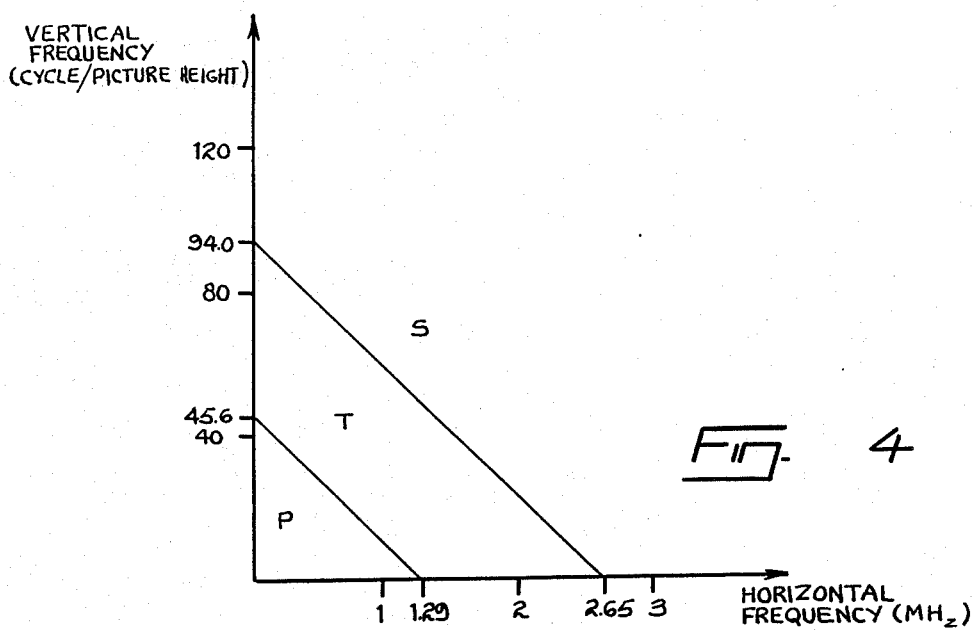
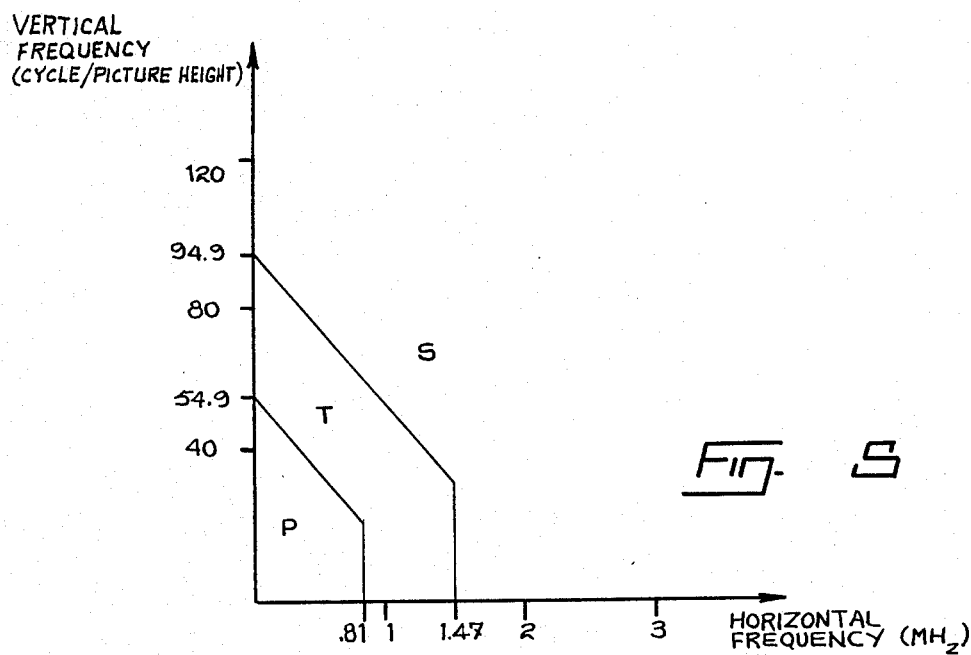

APPARATUS AND METHOD FOR ENCODING AND DECODING A NTSC COLOR VIDEO SIGNAL

FIELD OF THE INVENTION

This invention relates to an apparatus for encoding and an apparatus for decoding a NTSC color video signal. The present invention also relates to a method for encoding and a method for decoding a NTSC color video signal.

BACKGROUND OF THE INVENTION

The present invention relates to the encoding and decoding of composite NTSC television signals. The problem is to form a composite color television signal compatible with the existing NTSC television standard that permits the elimination of the annoying luminance-chrominance interference or crosstalk, which occurs with current systems, by the use of a suitable decoder.

The NTSC composite signal is formed by frequency multiplexing the luminance signal Y with two chrominance signals I and Q. These signals are obtained by a linear transformation of the gamma-corrected red, green and blue color primaries. The I and Q signals are low-pass filtered to have approximate bandwidths of 1.3 and 0.6 MH$_z$ respectively. These two chrominance signals are then quadrature amplitude modulated on a subcarrier of frequency $F_{sc}=3.579545$ MH$_z$. The subcarrier frequency is an odd multiple of half the horizontal scanning rate and an odd multiple of half the frame rate:

$$F_{sc} = \frac{455}{2} F_H = \frac{455 \times 525}{2} F_T$$

where $F_H = 15734.26$ H$_z$ and $F_T = 29.97$ H$_Z$. As a result, the subcarrier phase changes from line to line and from frame to frame. This choice of subcarrier frequency, made to reduce the visibility of the subcarrier at the receiver, has an important impact on the form of the spatio-temporal frequency spectrum of the NTSC composite signal. The television receiver has an intrafield vertical sampling frequency $F_1$ which corresponds to 262.5 cycle/picture height.

The modulated chrominance is then added to the luminance, to give:

U(t)=Y(t)+I(t)×cos(2πF$_{sc}$t+33°)
+Q(t)×sin(2πF$_{sc}$t+33°) (1)

This signal is low-pass filtered to 4.2 MH$_z$ to obtain the final composite signal. This filtering limits the luminance bandwidth and also removes part of the upper sideband of the I spectrum.

The conventional NTSC decoder uses a narrow notch filter to suppress the color subcarrier and thus derive the luminance from the composite signal. In so doing, some of the high-frequency chrominance is left in the luminance signal resulting in cross-luminance. The familiar subcarrier dots at abrupt color transitions are the main manifestation of this source of degradation in the signal. The modulated chrominance is obtained by use of a band-pass filter whose center frequency is $F_{sc}$. This horizontal chrominance filter will not reject any existing high-frequency luminance energy in the chrominance "band". This results in cross-color, which degrades the signal by adding spurious color to regions in the picture where high-frequency luminance energy is present. Recently, the use of comb filters in the decoder has become common. These comb filters reduce cross-color and increase effective horizontal luminance resolution at the expense of increased cross-luminance. Significant cross effects remain in the signal even when comb filter decoders are used.

One way to eliminate these degradations is to horizontally pre-filter Y so that no luminance energy remains in the chrominance "band". However, the resulting loss of resolution is unacceptable.

It is an object of the present invention to reduce cross effects between luminance and chrominance signals without excessive loss of luminance resolution.

SUMMARY OF THE INVENTION

According to the present invention there is provided a color video signal encoding signal for generating a NTSC color image composite signal for a television receiver, wherein a luminance signal Y and two chrominance signals I and Q are modulated on a color subcarrier having a frequency $F_{sc}$, said television receiver having an intrafield vertical sampling frequency $F_1$, comprising:

first non separable two dimensional filter means for low pass filtering said chrominance signal I, said first filter means having a horizontal bandwidth of substantially 1.3 MH$_z$;

second non-separable two dimensional filter means for low pass filtering said chrominance signal Q, said second filter means having a horizontal bandwidth of substantially 0.6 MH$_z$;

third non separable two dimensional filter means for band-stop filtering said luminance signal Y, said third filter means having a stop band centered on $\pm F_{sc}$ and $\pm F_1/2$, said stop band having a shape similar to the shape of the pass band of said first filter means so that said chrominance signals I and Q filtered by said first and second filter means can be inserted in the band covered by said stop band, said stop band having a horizontal bandwidth of substantially 2.6 MH$_z$ centered on $\pm F_{sc}$;

modulating means connected to the outputs of said first and second filters means for quadrants amplitude modulating said chrominance signals I and Q on said color subcarrier;

adder for adding signals generated by said third filter means and said modulating means, and generating a signal representative of said NTSC color image composite signal; and an output circuit connected to the output of said adder for generating said NTSC color image composite signal, said output circuit including fourth filter means having a bandwidth of substantially 4.2 MH$_z$ for low pass filtering said signal representative of said color image composite signal.

According to the present invention, there is also provided a color video signal decoding system for separating luminance signal Y' and chrominance signals I' and Q' from a NTSC color image composite signal in a television receiver, where a luminance signal Y and two chrominance signals I and Q have been modulated on a color subcarrier having a frequency $F_{sc}$, said television receiver having an intrafield vertical sampling frequency $F_1$, comprising:

first non separable two dimensional filter means for generating a chrominance signal by pass-band filtering said composite signal, said first filter means including a finite impulse response filter having a pass-band centered on $\pm F_{sc}$ and $\pm F_1/2$; subtracter means for generating said luminance signal
Y' by subtracting said chrominance signal from said composite signal;

demodulating means including a synchronous demodulator for demodulating said chrominance signal; and second and third low pass filter means connected to the outputs of said synchronous demodulator, said second and third filter means having respectively a horizontal bandwidth of substantially 1.3 and 0.6 MH$_z$ for generating respectively said chrominance signals I' and Q'.

According to the present invention, there is also provided a color video signal encoding method for generating a NTSC color image composite signal for a television receiver, wherein a luminance signal Y and two chrominance signals I and Q are modulated on a color subcarrier having a frequency $F_{sc}$, said television receiver having an intrafield vertical sampling frequency $F_1$, comprising the steps of:

(a) low pass filtering in two dimensions said chrominance signal I with a low pass band having a horizontal bandwidth of substantially 1.3 MH$_z$;

(b) low pass filtering in two dimensions said chrominance signal Q with a low pass band having a horizontal bandwidth of substantially 0.6 MH$_z$;

(c) band stop filtering in two dimensions said luminance signal with a stop band centered on $\pm F_{sc}$ and $\pm F_1/2$, said band stop having a shape similar to the shape of said pass band used in step (a) so that said signals generated by steps (a) and (b) can be inserted in the band covered by said stop band;

(d) modulating said chrominance signals I and Q generated by the steps (a) and (b) on said color subcarrier;

(e) adding the signal generated by the step (c) with the signals generated by the step (d); and (f) low pass filtering the signal generated by the step (e) with a low pass band having a bandwidth of substantially 4.2 MH$_z$ for generating said NTSC color image composite signal.

According to the present invention, there is also provided a color video signal decoding method for separating luminance signal Y' and chrominance signals I' and Q' from a NTSC color image composite signal in a television receiver, where a luminance signal Y and two chrominance signals I and Q have been modulated on a color subcarrier having a frequency $F_{sc}$, said television receiver having an intrafield vertical sampling frequency $F_1$, comprising the steps of:

(a) two dimensional band-pass filtering said NTSC composite signal for generating a chrominance signal, said two dimensional band-pass filtering being centered on $\pm F_{sc}$ and $\pm F_1/2$;

(b) subtracting said chrominance signal from said composite signal for generating said luminance signal Y';

(c) demodulating said chrominance signal for generating signals representative of said chrominance signals I' and Q'; and (d) low pass filtering said signals representative of said chrominance signals I' and Q' with low pass bands having respectively a bandwidth of substantially 1.3 and 0.6 MH$_z$ for generating said chrominance signals I' and Q' respectively.

Thus the encoding method proposed here to reduce the cross effects between luminance and chrominance signals without excessive loss of luminance resolution is to use non separable two dimensional filters to bandlimit the luminance and chrominance components before multiplexing so that they will occupy disjoint bands upon modulation and frequency multiplexing. The complementary chrominance and luminance bands can be chosen to give the best overall picture quality, without being restricted to the rectangular shapes imposed by the comb filter solution. This filtering has two effects: it reduces the resolution of both components compared with the full resolution permitted, and it may introduce ringing on sharp edges in the pictures if the filter cutoff is too sharp. Thus a preferred solution must determine the best tradeoff between crosstalk, resolution and ringing.

The objects, advantages and other features of the present invention will become more apparent upon reading of the following non-restrictive description of a preferred embodiment thereof, given for the purpose of exemplification only with references to the accompanying drawings.

BRIEF DESCRIPTION OF THE DRAWINGS

FIG. 4 illustrates the pass band of the low pass filter H$_i$ of the system shown in FIG. 1.

FIG. 5 illustrates the pass band of the low pass filter H$_q$ of the system shown in FIG. 1.

DETAILED DESCRIPTION OF DRAWINGS

Figure 1:
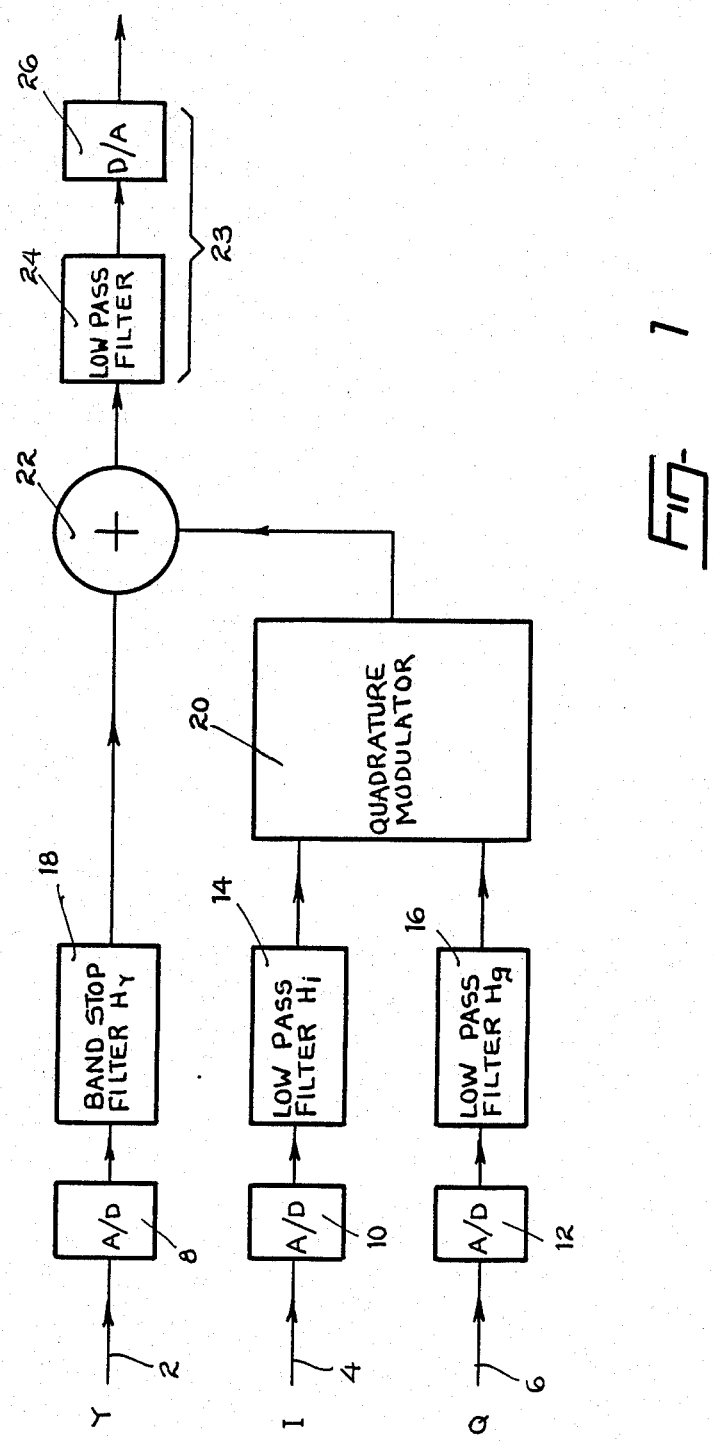
FIG. 1 illustrates in a block diagram form a color video signal encoding system according to the present invention.
Figure 6:
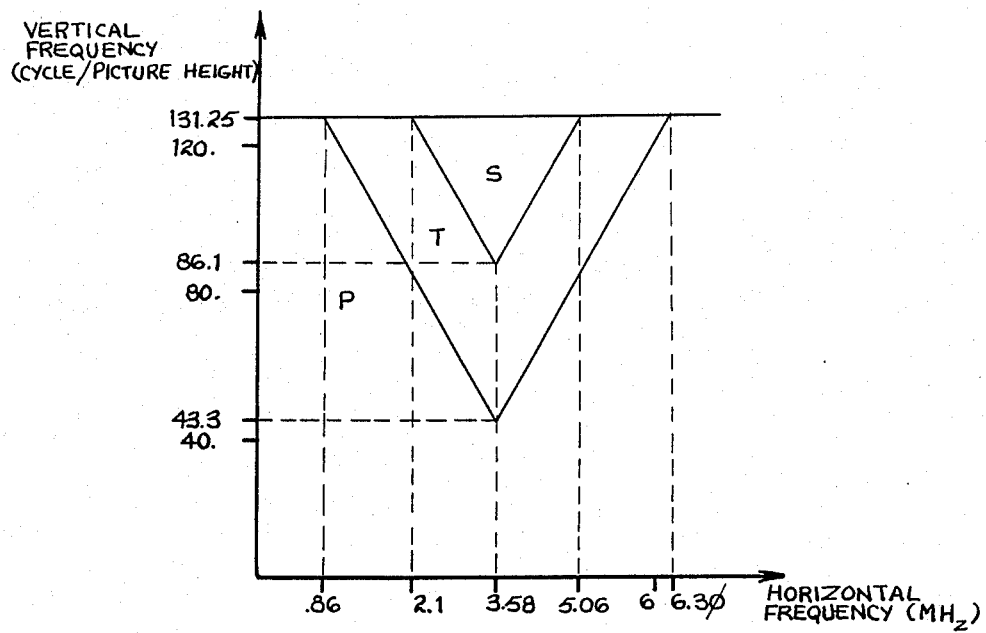
FIG. 6 illustrates the stop band of the band stop filter H$_y$ of the system shown in FIG. 1.

In FIG. 1, there is shown a color video signal encoding system for generating a NTSC color image composite signal for a television receiver. A luminance signal Y and two chrominance signals Y and Q are modulated on a color subcarrier having a frequency $F_{sc}$. The television receiver has an intrafield vertical sampling frequency $F_1=262.5$ c/ph or cycle/picture height. The encoding system comprises three inputs 2, 4 and 6 for receiving respectively the luminance signal Y and the two chrominance signals I and Q. The three inputs 2, 4 and 6 are connected respectively to three analog-to-digital converters 8, 10 and 12 for converting the luminance signal Y and the two chrominance signals I and Q into a digital form. A first non separable two dimensional digital filter 14 is provided for low pass filtering the digital chrominance signal I. The first filter 14 has a diamond shape with a horizontal bandwidth of 1.3 MH$_z$, a portion of the diamond shape is shown in figure 4. A second non separable two dimensional digital filter 16 is provided for low pass filtering the digital chrominance signal Q. The second filter 16 has also a diamond shape similar to the one of the first filter 14 except that its horizontal bandwidth is truncated around 0.6 MH$_z$, a portion of the truncated diamond shape of the second filter 16 is shown in FIG. 5. A third non separable two dimensional filter 18 is provided for band-stop filtering the luminance signal Y. The third filter 18 has a stop band centered on $\pm F_{sc}$ and $\pm F_1/2$. The stop band is made also of a diamond shape similar to the shape of the band pass of the first filter 14, a portion of the diamond shape of the stop band is shown in FIG. 6. The stopband is shaped so that the filtered chrominance spectrum can be inserted in the band of the stop band with minimal overlap. This permits a suitable receiver to cleanly separate the components to obtain Y, I, and Q components free from crosstalk. The horizontal bandwidth of the stop band is substantially 2.6 MH$_z$ centered of $\pm F_{sc}$, and the vertical bandwidth is centered on $\pm F_1/2$ =131.25 c/ph. A quadrature modulator 20 is connected to the outputs of the first and second filters 14 and 16 for quadrature amplitude modulating the chrominance signals I and Q on the color subcarrier $F_{sc}$. An adder 22 is connected to the output of the band-stop filter 18 and to the output of the quadrature modulator 20 for adding signals generated by the third filter 18 and by the quadrature modulator 20. The adder 22 generates a signal representative of the NTSC color image composite signal. An output circuit 23 is connected to the output of the adder 22 for generating the NTSC color image composite signal. The output circuit includes a fourth filter 24 having a bandwidth of 4.2 MH$_z$ for low pass filtering the signals representative of the color image composite signal, and a digital-to-analog converter 26 connected to the output of the low pass filter 24 for generating the NTSC color image composite signal. The 4.2 MH$_z$ low pass filtering not only has the effect of limiting the luminance bandwidth, but it also removes part of the upper sideband of the I component.

The first, second, third and fourth filters 14, 16, 18 and 24 are digital filters, however the digital-to-analog converter 26 can be interposed in between the adder 22 and the low pass filter 24; in this case, the fourth filter 24 is an analog filter. One person skilled in the art will understand that the analog-to-digital converters 8, 10 and 12, and the digital-to-analog converter 26 can be removed from the encoding system; thus, the encoding system would treat all the signals in analog form.

By considering individual fields of the video signal, the modulation process described above can be represented in terms of spatial frequencies. Because of the vertical sampling of the scanning process, the image spectrum is periodic in the vertical frequency dimension. The 180° phase shift of the color subcarrier from line to line causes the modulated chrominance spectrum to be centered at the horizontal frequency $F_{sc}$ and a vertical frequency $F_1/2$ which corresponds to 131.25 cycle/picture height or 131.25 c/ph.

The proposed NTSC encoder prefilters the chrominance components so that the spectrum of the modulated chrominance signal will lie within a specified chrominance band and prefilters the luminance component so that its spectrum is confined to the complementary band. When the luminance and modulated chrominance are added, their spectra are disjoint, and the two components be separated by a spatial filter. In order for the chrominance band to take on an arbitrary shape, non-separable two-dimensional filters must be used to prefilter the components.

The first filter 14 has a vertical bandwidth of substantially 46 c/ph. The second low pass filter 16 has a vertical bandwidth of substantially 55 c/ph. The third filter 18 has a vertical bandwidth of substantially 90 c/ph centered on $\pm F_1/2$.

The color video signal encoding system can carry out a color video encoding method which comprises the steps of (a) low pass filtering in two dimensions the chrominance signal I with a low pass band having a horizontal bandwidth of substantially 1.3 MH$_z$; (b) low pass filtering in two dimensions the chrominance signal Q with a low pass band having a horizontal bandwidth of substantially 0.6 MH$_z$; (c) band stop filtering in two dimensions the luminance signal with a stop band centered on $\pm F_{sc}$ and $\pm F_1/2$, the band stop having a shape similar to the shape of the pass band used in step (a) so that the signals generated by steps (a) and (b) can be inserted in the band covered by the stop band; (d) modulating the chrominance signals I and Q generated by the steps (a) and (b) on the color subcarrier; (e) adding the signal generated by the step (c) with the signal generated by step (d); and (f) low pass filtering the signal generated by the step (e) with a low pass band having a bandwidth of substantially 4.2 MH$_z$ for generating the NTSC color image composite signal.

The encoding method also comprises, prior to all the steps described above, a step of converting the luminance signal Y and the chrominance signals I and Q into digital form; and wherein the filterings of steps (a), (b) and (c) are digital filterings, and the step (f) also comprises a step of converting the signal generated by step (e) in an analog form.

The stop band used in step (c) and the pass band used in step (a) have a diamond shape, and the pass band used in step (b) has also a diamond shape similar to the diamond shape of said stop band except that its horizontal bandwidth is truncated around 0.6 MH$_z$.

Figure 2:
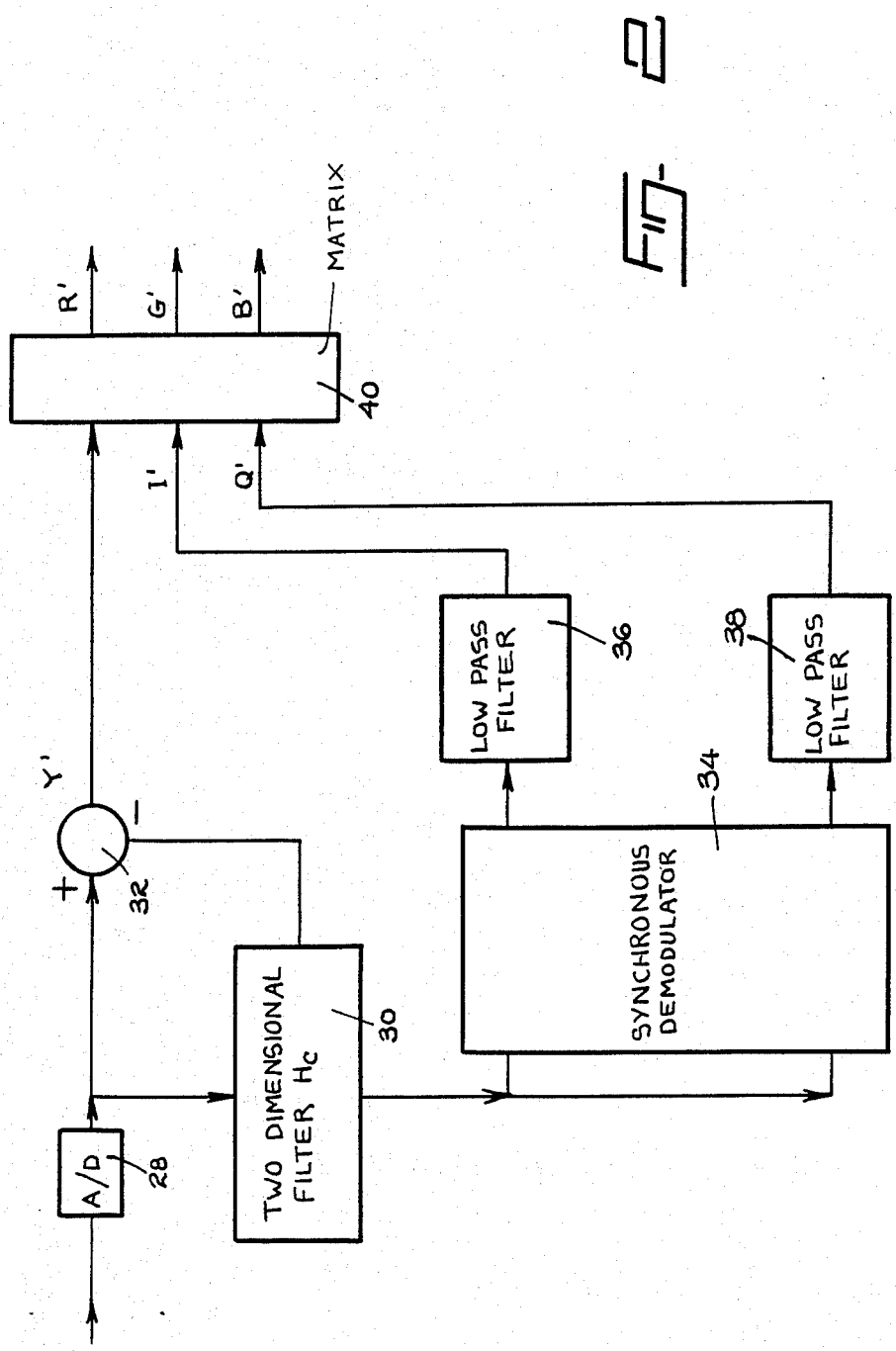
FIG. 2 illustrates in a block diagram form a color video signal decoding system according to the present invention.

In FIG. 2, there is shown a color video signal decoding system for separating luminance signal Y' and chrominance signals I' and Q' from a NTSC color image composite signal. The decoding system comprises an analog-to-digital converter 28 having an input for receiving the NTSC color image composite signal, and outputs connected to the input of a first non separable two dimensional digital filter H$_c$ 30, and to the input of a subtracter 32. The first two dimensional filter 30 is provided for generating a chrominance signal by bandpass filtering the composite signal. The first two dimensional filter 30 includes a finite impulse response filter having a band-pass centered on $\pm F_{sc}$ and $\pm F_1/2$. The outputs of the two dimensional filter 30 are connected to the subtracter 32 and to a synchronous demodulator 34. The substracter 32 generates a luminance signal Y' by subtracting the chrominance signal from the composite signal. The synchronous demodulator 34 demodulates the chrominance signal. The two outputs of the synchronous demodulator 34 are connected respectively to a second and third low pass digital filters for generating the chrominance signals I' and Q' respectively. The second and third filters have respectively a bandwidth of 1.3 and 0.6 MH$_z$.

The three signals Y', I' and Q' are then matrixed by a signal processing circuit 40 to obtain the red, green and blue components R', G', and B'.

Figure 7:
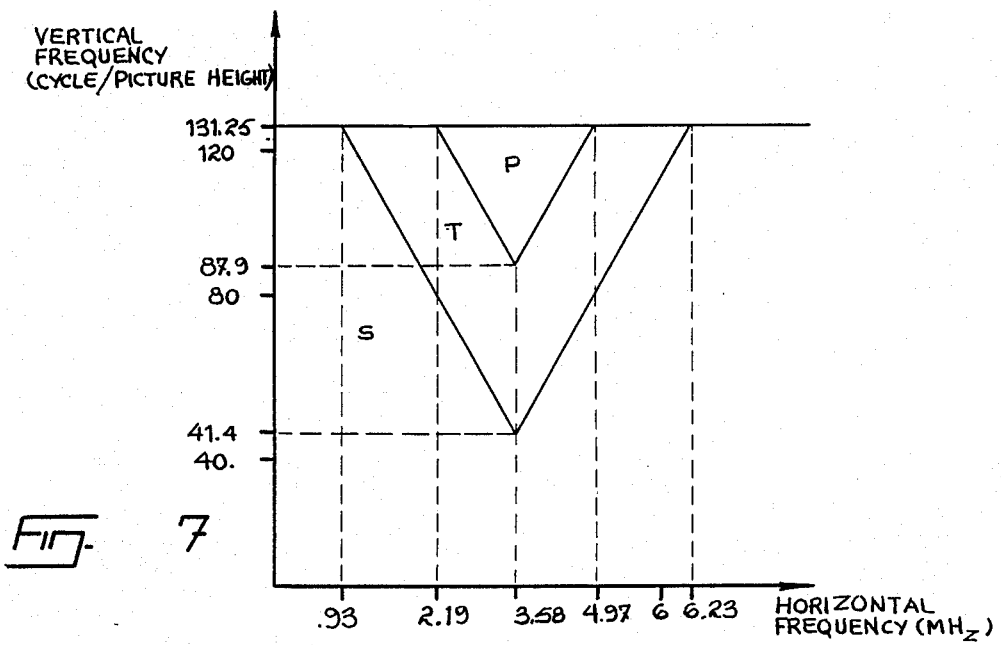
FIG. 7 illustrates the pass band of the two dimensional filter H$_c$ of the system shown in FIG. 2.

The first filter H$_c$ 30 has a diamond shape, and the pass band of the first filter 30 has a horizontal bandwidth of substantially 2.8 MH$_z$ centered on $\pm F_{sc}$, and a vertical bandwidth of substantially 87 c/ph centered on ±F₁/2. A portion of the diamond shape of the first filter H_c 30 is shown in FIG. 7.

The color video signal decoding system can carry out a color video decoding method which comprises the steps of (a) two dimensional band-pass filtering the NTSC composite signal for generating a chrominance signal, the two dimensional band-pass filtering being centered on $\pm F_{sc}$ and $\pm F_1 2$; (b) subtracting the chrominance signal from the composite signal for generating the luminance signal Y'; (c) demodulating the composite chrominance signal for generating signals representative of the chrominance signals I' and Q'; and (d) low pass filtering the signals representative of the chrominance signals I' and Q' with low pass bands having respectively a horizontal bandwidth of substantially 1.3 and 0.6 MH_z for generating the chrominance signals I' and Q' respectively.

The decoding method also comprises, prior to all the steps described above, a step of converting the NTSC composite signal into a digital form; and wherein the filterings of steps a) and d) are digital filterings.

Referring now to FIG. 4, 5, 6 and 7, there are shown a portion of the pass band of the filter $H_i$, $H_q$, $H_y$ and $H_c$ respectively. In these figure the "S" bands refer to the stop bands of the filters. These stop bands have a minimum attenuation of 20 dB. The "P" band refer to the pass bands of the filters. These pass bands have a maximum attenuation of 1 dB. The "T" bands refer to the transition bands of the filters. In these transition bands the frequency responses of the filters fall monotonically from the pass bands to the stop bands.

Figure 3:
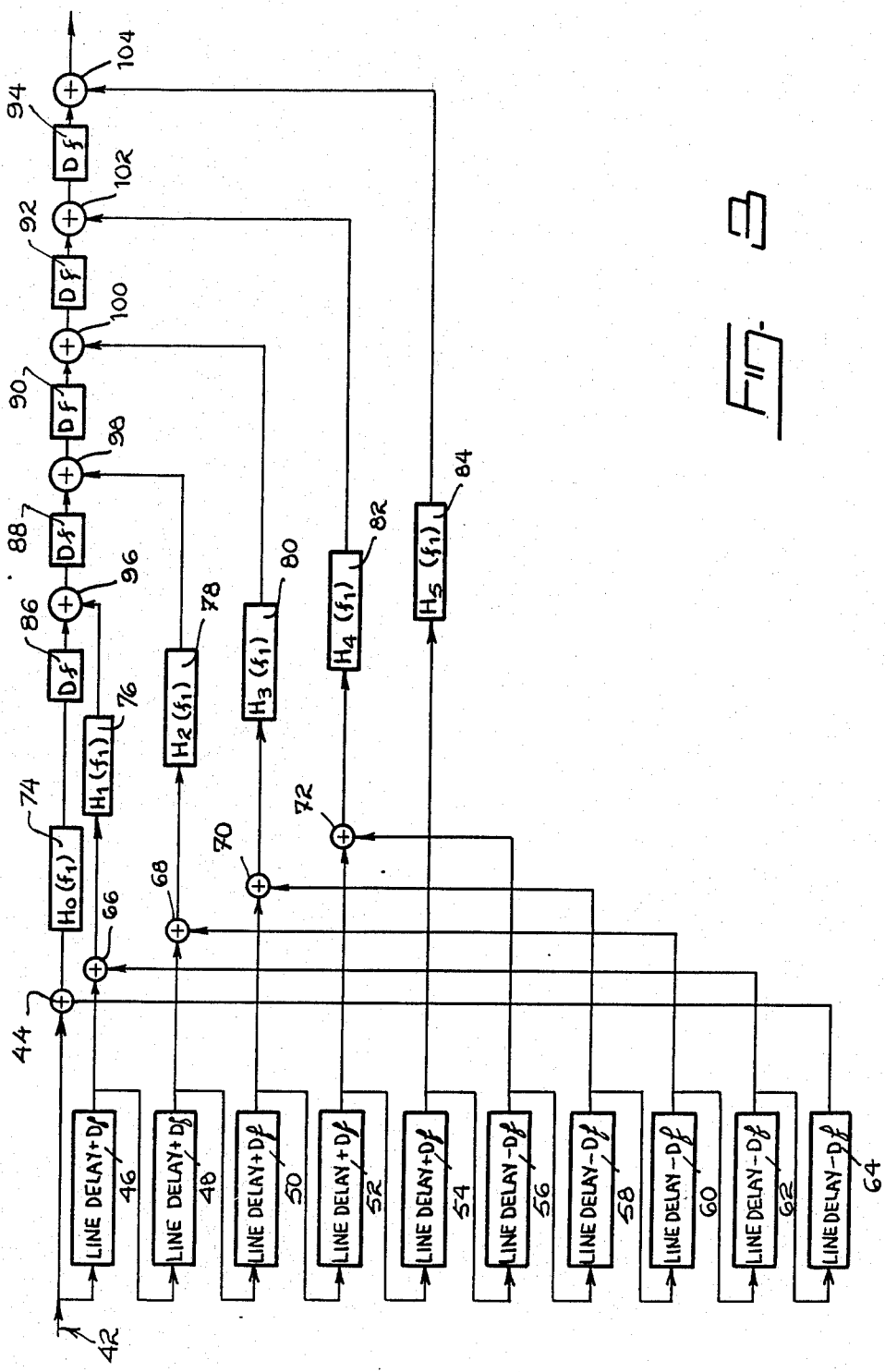
FIG. 3 illustrates in a block diagram form the general structure of a non separable two dimensional filters that can be used in the system shown in FIG. 1 and FIG. 2.

Referring now to FIG. 3, there is shown in a block diagram form the general filter structure of the non separable two dimensional filters $H_i$, $H_q$, $H_y$ and $H_c$ of FIG. 1 and 2 for obtaining the frequency domain specifications shown in FIG. 4, 5, 6 and 7 respectively. The general filter has a symmetrical vertical frequency response. The input 42 of the general filter is connected to a first adder 44 and to a first series of ten delay elements which are connected in series to each other. The first five delay elements have a delay of one video line +Df where the delay of one video line is 63.555 μs and Df is 31 samples at 4 $F_{sc}$ which corresponds to 2.09 μ second. The last five delay element of the series have a delay of one video line—Df.

The first four delay elements 46, 48, 50 and 52 of the series have their output connected to the input of a second, third, fourth and fifth adder 66, 68, 70 and 72 respectively. The last five delay elements 56, 58, 60, 62 and 64 of the series have their output connected to the input of the fifth, fourth, third, second and first adder 72, 70, 68, 66 and 44 respectively. The five adders 44, 66, 68, 70 and 72 have their output connected to five one dimensional horizontal filters 74, 76, 78, 80 and 82 with frequency responses H₀(f₁), H₁(f₁), H₂(f₁), H₃(f₁) and H₄(f₁) respectively. The output of the fifth delay element 54 is connected directly in the input of a sixth one dimensional horizontal filter 84 with a frequency response H₅(f₁).

The one dimensional horizontal filter 74 is connected to the first adder 96 of a second series of five adders 96, 98, 100, 102 and 104 via a delay element Df 86. The five adders of the second series 96, 98, 100, 102 and 104 are connected in series to each other via four delay elements Df 88, 90, 92 and 94 respectively. The one dimensional horizontal filters 76, 78, 80, 82 and 84, have their output connected to the inputs of the second series of adders 96, 98, 100, 102 and 104, respectively. The output of the last adder of the second series 104 is the output of the general filter.

The second series of delay elements Df 86, 88, 90, 92 and 94 are required at the output of the one dimensional filters in order to add up the suitably registered versions of the signals to obtain the final filtered signal. The first series of ten delay elements and the frequency responses of the one-dimensional filters must be chosen to obtain the desired two-dimensional frequency response. The example of FIG. 3 shows a first series of ten delay elements, but the method is not limited to this.

The delays and horizontal filters can be implemented by either analog or digital means. If digital delays and filters are used, the encoder must include analog to digital converters for each of the Y, I and Q components and a digital-to-analog converter for the composite signal. Similarly, the decoder must include an analog-to-digital converter for the input NTSC signal, and an output digital-to-analog converter for the Y', I', and Q' signals.

The one dimensional horizontal filters of the encoding system are linear phase FIR digital filters with a sampling rate of 4 $f_{sc}$ for the Y component and 2 $f_{sc}$ for the I and Q components. The frequency responses of the horizontal filters have the following transfer function:

$$H_k(f_1) = h(0,k) + 2 \sum_{l=0}^{M} h(l,k)\cos(\pi f_1 l/f_{sc})$$

The impulse response coefficients h(l,k) of the filters Hy, Hi, and Hq for obtaining the frequency domain specifications shown in FIGS. 4, 5 and 6, according to the above transfer function, are shown in Table 1(a), (b) and (c) respectively.

The two dimensional filter of the decoding system for matching the filter of the encoding system, comprises one dimensional horizontal filters which are FIR digital filters with a sampling frequency of 4 $F_{sc}$. The impulse response coefficients h(l,k) of the filter $H_c$ for obtaining the frequency domain specification shown in FIG. 7, according to the above transfer function, is shown in Table 2.

Similar filters for the encoding and decoding system with a sampling frequency of 13.5 MH_z can be used and work equally well.

Figure 8:
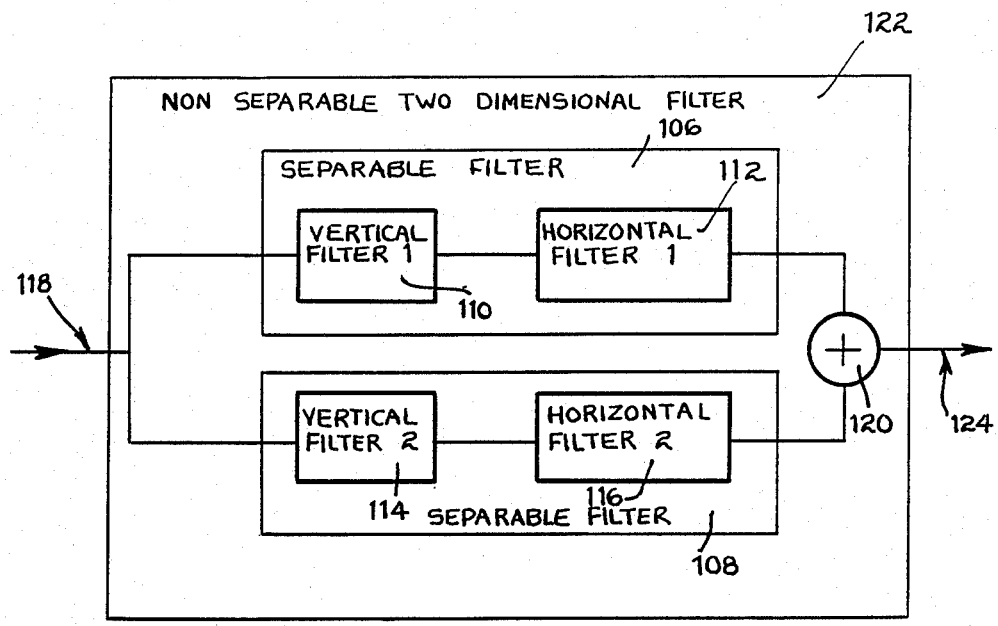
FIG. 8 illustrates in a block diagram form another general structure of a non separable two dimensional filter that can be used in the systems shown in FIG. 1 and FIG. 2.

Referring now to FIG. 8, there is shown in a block diagram form another general filter structure of the non separable two dimensional filters $H_i$, $H_q$, $H_y$ and $H_c$ of FIGS. 1 and 2 for obtaining the frequency domain specifications shown in FIGS. 4, 5, 6 and 7 respectively. This general non separable two dimensional filter is an alternative to the fully general non separable two dimensional filter of FIG. 3 that can be used for reducing the complexity of the filter shown in FIG. 3. This general structure comprises a first and second separable two dimensional filters 106 and 108 which are connected in parallel. The first separable filter 106 comprises a first vertical filter 110 and a first horizontal filter 112. The first vertical and horizontal filters 110 and 112 are connected in series, the input 118 of the non separable two dimensional filter 122 being connected to the input of the first vertical filter 110. The output of the first separable two dimensional filter 106 is provided by the output of the first horizontal filter 112.

The second separable two dimensional filter 108 comprises a second vertical filter 114 and a second horizontal filter 116. The second vertical and horizontal filters are connected in series. The input 118 of the non separable two dimensional filter is connected to the input of the second vertical filter 114. The output of the second separable two dimensional filter 108 is provided by the output of the second horizontal filter 116. An adder 120 is conneced to the output of the first and second separable two dimensional filters 106 and 108 for generating the output 124 of the non separable two dimensional filter 122.

Figure 9:
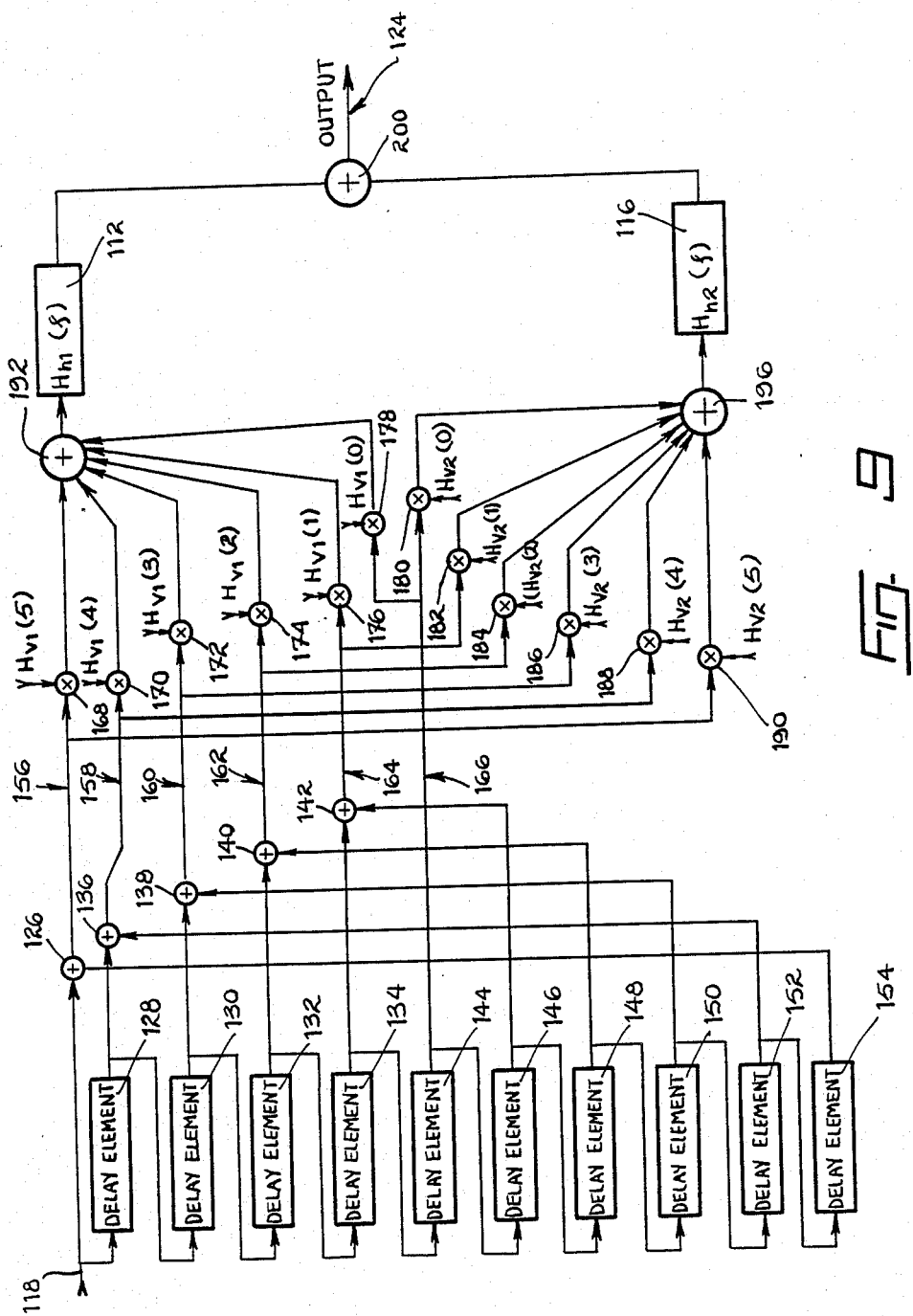
FIG. 9 illustrates in detail the general structure shown in FIG. 8.

Referring now to FIG. 9, there is shown in a block diagram from with more details the non separable two dimensional filter of FIG. 8. The input 118 of the non separable two dimensional filter is connected to a first adder 126 and to a series of ten delay elements which are connected in series to each other. Each delay element has a delay of one video line which corresponds to 63.555 $\mu$ sec. The first four delay elements 128, 130, 132 and 134 of the series have their output connected to the input of a second, third, fourth and fifth adder 136, 138, 140 and 142 respectively. The last five delay elements 146, 148, 150, 152 and 154 of the series have their output connected to the input of the fifth, fourth, third, second and first adder 142, 140, 138, 136 and 126 respectively. The first five adder 126, 136, 138, 140 and 142 provide five output delay line 156, 158, 160, 162 and 164 respectively. A sixth delay line 166 is provided by the output of the fifth delay element 144. The six delay lines 156, 158, 160, 162, 164 and 166 are connected to a first series of six multipliers 168, 170, 172, 174, 176 and 178 respectively for multiplying the six delay lines with the coefficients of the first vertical filter. These coefficients are $H_{v1}(5)$, $H_{v1}(4)$, $H_{v1}(3)$, $H_{v1}(2)$, $H_{v1}(1)$ and $H_{v1}(0)$. The outputs of this first series of multiplier are connected to an adder 192 and the output of this adder 192 is connected to a first horizontal filter $H_{hl}(f_1)$ 112. The six delay lines 156, 158, 160, 162 and 164 are also connected to a second series of six multipliers 190, 188, 186, 184, 182 and 180 respectively for multiplying the six delay lines with the coefficients of the second vertical filter. These coefficients are $H_{v2}(5)$, $H_{v2}(4)$, $H_{v2}(3)$, $H_{v2}(2)$, $H_{v2}(1)$ and $H_{v2}(0)$. The outputs of this second series of multiplier are connected to another adder 196 and the output of this other adder 196 is conneced to a second horizontal filter $H_{h2}(f_1)$ 116. The outputs of the first horizontal filter 112 and the second horizontal filter 116 are added by means of an adder 200 and the output 124 of this adder 200 provides the output of the filter.

The configuration shown in FIG. 8 and 9 is the parallel arrangement of two separable filters 106 and 108. The input signal is passed simultaneously through two separable filters 106 and 108, and the output of the two filters is added. With this configuration, only two horizontal filters 112 and 116 are required rather than six in the general structure shown in FIG. 3. The two vertical filters 110 and 114 can share the same delay elements so that the same number of delay elements as shown in FIG. 3 is required. The output of the line delays are multiplied by the coefficients of the first vertical filter 110 $H_{v1}(f_2)$, added together, then passed through the horizontal filter 112 $H_{h1}(f_1)$. The same line delays are multiplied by the coefficients of the vertical filter 114 $H_{v1}(f_2)$, added together and passed through the horizontal filter 116 $H_{h2}(f_1)$. The outputs of the two horizontal filters 112 and 116 are added together to form the output signal. This structure can be realized in analog or digital form.

As an example, a digital implementation for the filter $H_i$ can be done with a $4f_{sc}$ sampling rate. The horizontal filters are specified by the following equation:

$$H_{hi}(f_1) = h_{hi}(0) + 2 \sum_{l=0}^{7} h_{hi}(l)\cos(\pi f_1 l/f_{sc}), \; i = 1,2$$

wherein Table 3(a) shows the horizontal filter coefficients $h_{h1}(1)$ and $h_{h2}(1)$ and Table 3(b) shows the vertical filter coefficients $h_{v1}(k)$ and $h_{v2}(k)$.

TABLE 1(a)

| k/l | 0 | 1 | 2 | 3 | 4 | 5 | 6 | 7 |
|---|---|---|---|---|---|---|---|---|
| 0 | .844364 | .113335 | −.039468 | .005243 | −.003705 | .002663 | .000121 | −.000213 |
| 1 | .117506 | −.081010 | .019249 | .005130 | −.001366 | −.000399 | −.000909 | .000367 |
| 2 | −.046699 | .022930 | +.012773 | −.017899 | .006104 | −.001053 | .000758 | −.000057 |
| 3 | .006391 | .005638 | −.019647 | .013343 | −.001327 | −.002140 | .001277 | −.000773 |
| 4 | −.001408 | −.003812 | .007447 | −.000855 | −.004401 | .003456 | −.001259 | .000157 |
| 5 | .002978 | −.000598 | −.000521 | −.002968 | .002958 | −.000783 | −.000291 | .001879 |

TABLE 1(b)

| k/l | 0 | 1 | 2 | 3 | 4 | 5 | 6 | 7 |
|---|---|---|---|---|---|---|---|---|
| 0 | .160526 | .115392 | .039113 | .005977 | .005188 | .003187 | −.001068 | −.000463 |
| 1 | .119411 | .080066 | .016601 | −.005869 | −.000987 | .000216 | −.001912 | −.001220 |
| 2 | .045999 | .020519 | −.015880 | −.018797 | −.005157 | −.000743 | −.001731 | .000089 |
| 3 | .008573 | −.005120 | −.018434 | −.011172 | .001614 | .003990 | .000270 | .002667 |
| 4 | .002848 | −.003147 | −.006950 | .001170 | .006462 | .002253 | −.000561 | .000791 |
| 5 | .002221 | −.001018 | −.001852 | .003756 | .003239 | −.002704 | −.002999 | −.000717 |

TABLE 1(c)

| k/l | 0 | 1 | 2 | 3 | 4 | 5 | 6 | 7 |
|---|---|---|---|---|---|---|---|---|
| 0 | .131844 | .112875 | .068810 | .023927 | −.001519 | −.006544 | −.001314 | .003845 |
| 1 | .091096 | .076212 | .047126 | .007841 | −.008923 | −.009043 | −.002718 | .002110 |
| 2 | .020386 | .013743 | −.000972 | −.012977 | −.014608 | −.008459 | −.001786 | .001127 |
| 3 | −.009544 | −.011201 | −.012077 | −.010248 | −.004747 | .000271 | .001829 | .003482 |
| 4 | −.004790 | −.003337 | −.000815 | .002577 | .004925 | .004920 | .003479 | .000264 |
| 5 | −.000292 | .001259 | .003255 | .004468 | .003082 | .000582 | −.000645 | −.002134 |

TABLE 2

| k/l | 0 | 1 | 2 | 3 | 4 | 5 | 6 | 7 |
|---|---|---|---|---|---|---|---|---|
| 0 | .158081 | .114363 | .039291 | −.005610 | .004446 | −.002925 | −.001137 | .000338 |
| 1 | −.118458 | .080538 | −.017925 | −.005500 | .001176 | .000307 | .001411 | −.000794 |
| 2 | .046349 | −.021725 | −.014326 | .018348 | −.005630 | .000898 | −.001244 | −.000016 |
| 3 | −.007482 | −.005379 | .019647 | −.012257 | −.000144 | .003065 | −.000503 | .001720 |
| 4 | .002128 | .003480 | −.007199 | −.001013 | .005432 | −.002855 | .000349 | −.000317 |
| 5 | −.002599 | −.000210 | .001187 | .003362 | −.003099 | −.000960 | .001645 | −.001298 |

TABLE 3(a)

| /l | 0 | 1 | 2 | 3 | 4 | 5 | 6 | 7 |
|---|---|---|---|---|---|---|---|---|
| $h_{h1}(l)$ | .115303 | .084541 | .009857 | −.026525 | −.020901 | −.003272 | .008620 | .007867 |
| $h_{h2}(l)$ | .187601 | .152363 | .114923 | .044399 | −.007943 | −.017791 | −.011495 | −.006243 |

TABLE 3(b)

| /k | 0 | 1 | 2 | 3 | 4 | 5 |
|---|---|---|---|---|---|---|
| $h_{v1}(k)$ | .600208 | .502779 | .303558 | .105599 | −.022007 | −.012903 |
| $h_{v2}(k)$ | .360603 | .240719 | .010116 | −.096021 | −.047863 | .008879 |

The embodiments of the invention in which an exclusive property of privilege is claimed are defined as follows:

1. A color video signal encoding system for generating a NTSC color imate composite signal for a television receiver, wherein a luminance signal Y and two chrominance signals I and Q are modulated on a color subcarrier having a frequency $F_{sc}$, said television receiver having an intrafield vertical sampling frequency $F_1$, comprising:

first non separable two dimensional filter means for low pass filtering said chrominance signal I, said first filter means having a horizontal bandwidth of substantially 1.3 $MH_z$, the pass band of said first filter means having a diamond shape;

second non separable two dimensional filter means for low pass filtering said chrominance signal Q, said second filter means having a horizontal bandwidth of substantially 0.6 $MH_z$, the pass band of said second filter means having a diamond shape similar to the diamond shape of said first filter means except that its horizontal bandwidth is truncated around 0.6 MHz;

third non separable two dimensional filter means for band-stop filtering said luminance signal Y, said third filter means having a stop band centered on $\pm F_{sc}$ and $\pm F_1/2$, said stop band having a shape similar to the shape of the pass band of said first filter means so that said chrominance signals I and Q filtered by said first and second filter means respectively can be inserted in the band covered by said stop band, said stop band having a horizontal bandwidth of substantially 2.6 $MH_z$ centered on $\pm F_{sc}$, said stop band of said third filter means having a diamond shape similar to the shape of said pass band of said first roller means;

modulating means connected to the outputs of said first and second filter means for quadrature amplitude modulating said chrominance signals I and Q on said color subcarrier;

adder for adding signals generated by said third filter means and said modulating means, and generating a signal representative of said NTSC color image composite signal; and an output circuit connected to the output of said adder for generating said NTSC color image composite signal, said output circuit including fourth filter means having a bandwidth of substantially 4.2 $MH_z$ for low pass filtering said signal representative of said color image composite signal.

2. A color video signal encoding system as defined in claim 1, comprising:

analog-to-digital converter means having inputs for receiving said luminance signal Y and said two chrominance signals I and Q, and outputs connected to the inputs of said first, second and third filter means for generating digital luminance and chrominance signals Y, I and Q respectively; and wherein said first, second and third filter means are digital filter means, and said output circuit comprises a digital-to-analog converter means for converting into analog form said signal representative of said NTSC color image composite signal.

3. A color video signal encoding system as defined in claim 1, wherein the pass band of said first filter means has a diamond shape, said stop band of said third filter means has a diamond shape similar to the shape of said pass band of said first filter means, and the pass band of said second filter means has also a diamond shape similar to the diamond shape of said first filter means except that its horizontal bandwidth is truncated around 0.6 $MH_z$.

4. A color video signal encoding system as defined in claim 1 wherein:

said first filter means has a vertical bandwidth of substantially 46 c/ph;

said second low pass filter means has a vertical bandwidth of substantially 55 c/ph; and said third filter means has a vertical bandwidth of substantially 90 c/ph centered on $\pm F_1/2$.

5. A color video signal encoding system for generating a NTSC color image composite signal for a television receiver, wherein a luminance signal Y and two chrominance signals I and Q are modulated on a color subcarrier having a frequency $F_{sc}$, said television receiver having an intrafield vertical sampling frequency $F_1$, comprising:

first non separable two dimensional filter means for low pass filtering said chrominance signal I, said first filter means having a horizontal bandwidth of substantially 1.3 $MH_z$, second non separable two dimensional filter means for low pass filtering said chrominance signal Q, said second filter means having a horizontal bandwidth of substantially 0.6 MH$_z$;

third non separable two dimensional filter means for band-stop filtering said luminance signal Y, said third filter means having a stop band centered on $\pm F_{sc}$ and $\pm F_1/2$, said stop band having a shape similar to the shape of the pass band of said first filter means so that said chrominance signals I and Q filtered by said first and second filter means respectively can be inserted in the band covered by said stop band, said stop band having a horizontal bandwidth of substantially 2.6 MH$_z$ centered on $\pm F_{sc}$, said non separable two dimensional filter means comprising:

a first separable two dimensional filter having a first vertical filter and a first horizontal filter, said first vertical and horizontal filters being connected in series, the input of said non separable two dimensional filter means being connected to the input of said first vertical and horizontal filters connected in series, the output of said first separable two dimensional filter being provided by the output of said first vertical and horizontal filters connected in series; and a second separable two dimensional filter having a second vertical filter and a second horizontal filter, said second vertical and horizontal filters being connected in series, the input of said non separable two dimensional filter means being connected to the input of said second vertical and horizontal filters connected in series, the output of said second separable two dimensional filter being provided by the output of said second vertical and horizontal filters connected in series; and adder for adding the outputs of said first and second separable two dimensional filters, and generating the output of said non separable two dimensional filter means;

modulating means connected to the outputs of said first and second filter means for quadrature amplitude modulating said chrominance signals I and Q on said color subcarrier;

adder for adding signals generated by said third filter means and said modulating means, and generating a signal representative of said NTSC color image composite signal; and an output circuit connected to the output of said adder for generating said NTSC color image composite signal, said output circuit including fourth filter means having a bandwidth substantially 4.2 MH$_z$ for low pass filtering said signal representative of said color image composite signal.

6. A color video signal decoding system for separating luminance signal Y' and chrominance signals I' and Q' from a NTSC color image composite signal in a television receiver, where a luminance signal Y and two chrominance signals I and Q have been modulated on a color subcarrier having a frequency $F_{sc}$, said television receiver having an intrafield vertical frequency $F_1$, comprising:

first non separable two dimensional filter means for generating a chrominance signal by pass-band filtering said composite signal, said first filter means including a finite impulse response filter having a pass-band centered on $\pm F_{sc}$ and $\pm F_1/2$, said pass band of said first filter means having a diamond shape with a horizontal bandwidth of substantially 2.8 MH$_z$ centered on $\pm F_{sc}$, and a vertical bandwidth of substantially 87 c/ph centered on $\pm F_12$;

subtractor means for generating said luminance signal Y' by subtracting said chrominance signal from said composite signal;

demodulating means including a synchronous demodulator for demodulating said chrominance signal; and second and third low pass filter means connected to the outputs of said synchronous demodulator, said second and third filter means having respectively a horizontal bandwidth of substantially 1.3 and 0.6 MH$_z$ for generating respectively said chrominance signals I' and Q'.

7. A color video signal decoding system as defined in claim 6, comprising:

analog-to-digital converter means having an input for receiving said color image composite signal and outputs connected respectively to the input of said two dimensional band-pass filter means and to the input of said subtracter means; and wherein said first, second and third filter means are digital filter means.

8. A color video signal decoding system as defined in claim 6, wherein said pass band of said first filter means a has diamond shape, and said pass band of said first filter means has a horizontal bandwidth of substantially 2.8 MH$_z$ centered on $\pm F_{sc}$, and a vertical bandwidth of substantially 87 c/ph centered on $\pm F_1/2$.

9. A color video signal decoding system for separating luminance signal Y' and chrominance signals I' and Q' from a NTSC color image composite signal in a television receiver, where a luminance signal Y and two chrominance signals I and Q have been modulated on a color subcarrier having a frequency $F_{sc}$, said television receiver having an intrafield vertical frequency $F_1$, comprising:

first non separable two dimensional filter means for generating a chrominance signal by pass-band filtering said composite signal, said first filter means including a finite impulse response filter having a pass-band centered on $\pm F_{sc}$ and $\pm F_1/2$, said non separable two dimensional filter means comprising:

a first separable two dimensional filter having a first vertical filter and a first horizontal filter, said first vertical and horizontal filters being connected in series, the input of said non separable two dimensional filter means being connected to the input of said first vertical and horizontal filters connected in series, the output of said first separable two dimensional filter being provided by the output of said first vertical and horizontal filters connected in series; and a second separable two dimensional filter having a second vertical filter and a second horizontal filter, said second vertical and horizontal filters being connected in series, the input of said non separable two dimensional filter means being connected to the input of said second vertical and horizontal filters connected in series, the output of said second separable two dimensional filter being provided by the output of said second vertical and horizontal filters connected in series; and adder for adding the outputs of said first and second separable two dimensional filters, and generating the output of said non separable two dimensional filter means, subtracter means for generating said luminance signal Y' by subtracting said chrominance signal from said composite signal;

demodulating means including a synchronous demodulator for demodulating said chrominance signal; and second and third low pass filter means connected to the outputs of said synchronous demodulator, said second and third filter means having respectively a horizontal bandwidth of substantially 1.3 and 0.6 $MH_z$ for generating respectively said chrominance signals I' and Q'.

10. A color video signal encoding method for generating a NTSC color image composite signal for a television receiver, wherein a luminance signal Y and two chrominance signals I and Q are modulated on a color subcarrier having a frequency $F_{sc}$, said television receiver having an intrafield vertical sampling frequency $F_1$, comprising the steps of:

(a) low pass filtering in two dimensions said chrominance signal I with a low pass band having a diamond shape and a horizontal bandwidth of substantially 1.3 $MH_z$;

(b) low pass filtering in two dimensions said chrominance signal Q with a low pass band having a horizontal bandwidth of substantially 0.6 $MH_z$ and having a diamond shape similar to the diamond shape of said low pass band used in step (a) except that its horizontal bandwidth is truncated around 0.6 $MH_z$;

(d) band stop filtering in two dimensions said luminance signal with a stop band centered on $\pm F_{sc}$ and $\pm F_1/2$, said band stop having a diamond shape similar to the shape of said pass band used in step a) so that said signals generated by steps a) and b) can be inserted in the band covered by said stop band;

(d) modulating said chrominance signals I and Q generated by the steps of (a) and (b) on said color subcarrier;

(e) adding the signal generated by the step (c) with the signals generated by the step (d); and (f) low pass filtering the signal generated by the step (e) with a low pass band having a bandwidth of substantially 4.2 $MH_z$ for generating said NTSC color image composite signal.

11. A color video encoding method as defined in claim 10, comprising, prior to all the steps of claim 10, a step of:

converting said luminance signal Y and said chrominance signals I and Q into digital form; and wherein said filterings of steps (a), (b) and (c) are digital filterings; and said step (f) comprises a step of converting the signal generated by step (e) in an analog form.

12. A color video signal encoding method as defined in claim 10, wherein said stop band used in step (c) and said pass band used in step (a) have a diamond shape and said pass band used in step (e) has also a diamond shape similar to the diamond shape of said stop band except that its horizontal bandwidth is truncated around 0.6 $MH_z$.

13. A color video signal decoding method for separating luminance signal Y' and chrominance signals I' and Q' from a NTSC color image composite signal in a television receiver, where a luminance signal Y and two chrominance signals I and Q have been modulated on a color subcarrier having a frequency $F_{sc}$, said television receiver having an intrafield vertical sampling frequency $F_1$, comprising the steps of:

(a) two dimensional band-pass filtering said NTSC composite signal by means of a pass-band for generating a chrominance signal, said two dimensional band-pass filtering being centered on $\pm F_{sc}$ and $\pm F_1/2$, said pass-band having a diamond shape with a horizontal bandwidth of substantially 2.8 $MH_z$ centered on $\pm F_{sc}$, and a vertical bandwidth of substantially 87 c/ph centered on $\pm F_12$;

(b) subtracting said chrominance signal from said composite signal for generating said luminance signal Y';

(c) demodulating said composite chrominance signal for generating signals representative of said chrominance signals I' and Q' and (d) low pass filtering said signals representative of said chrominance signals I' and Q' with low pass bands having respectively a horizontal bandwidth of substantially 1.3 and 0.6 $MH_z$ for generating said chrominance signals I' and Q' respectively.

14. A color video signal decoding method as defined in claim 13, comprising, prior to all the steps of claim 13, a step of:

converting said NTSC composite signal into a digital form; and wherein said filterings of steps (a) and (d) are digital filterings.

* * * * *